United States Patent
Lee

Patent Number: 5,699,623
Date of Patent: Dec. 23, 1997

[54] TAPE MEASURE

[76] Inventor: Rule Lee, 1F., No. 22, Lane 81, Sec. 2, Tu Hua S. Rd., Taipei, Taiwan

[21] Appl. No.: 754,319

[22] Filed: Nov. 21, 1996

[51] Int. Cl.$^6$ ............................................. G01B 3/10
[52] U.S. Cl. .............................. 33/758; 33/755; 33/770
[58] Field of Search ............................ 33/758, 755, 768, 33/770

[56] References Cited

U.S. PATENT DOCUMENTS

| | | | |
|---|---|---|---|
| 3,131,480 | 5/1964 | Quenot | 33/770 |
| 4,300,289 | 11/1981 | DeHaven | 33/770 |

FOREIGN PATENT DOCUMENTS

| | | | |
|---|---|---|---|
| 1366948 | 6/1964 | France | 33/758 |
| 402200 | 11/1933 | United Kingdom | 33/755 |

*Primary Examiner*—Christopher W. Fulton
*Attorney, Agent, or Firm*—David & Raymond; Raymond Y.C. Chan

[57] ABSTRACT

An improvement for the structure of end hook for the tape measure consists of a U-shaped flexible elongated metal folder and a conventional end hook. The U-shaped flexible elongated metal folder, having a slim parallel gap which is slightly greater than the thickness of the metallic tape, sandwiches the tape therebetween at the outer end of the tape below the end hook. At the outer edge of the tape, there is a rectangular notch, whose depth is equal to or a little greater than the thickness of the end hook. The flexible elongated metal folder is longer than the end hook, with the closed end thereof engaging the said rectangular notch, so that there is an extended portion stretching beyond the inner end of the end hook. The conventional end hook is mounted on the said metal folder and the tape, overlapping with the metal folder and the tape, then all these three elements are riveted together. The extended portion of the metal floder without overlapping with the end hook is riveted with the tape only. The reeinforcement with the additional U-shaped flexible elongated metal folder improves the structure of conventional end hook in enhancing considerably the strength to withstand the stress of impact, forfending the usual disadvantage of fracture or rupture of the tape and rivet failure.

5 Claims, 3 Drawing Sheets

5,699,623

TAPE MEASURE

BACKGROUND OF THE INVENTION

1. Field of the Invention

This invention relates to an improvement for tape measures and particularly to the end hook of a tape measure which provides a relatively long lived structure.

2. Description of the Prior Art

Conventional coilable tape measure has an end hook made of metal strip affixed to the tape at the outer end. The rapid retraction of the tape often produces great impact force and results in drastical whipping up and down during automatic retraction of the tape. Such a phenomenon readily give rise to fracture of the tape in the area of inner end of the end hook, when the end hook hits the case front of tape measure and its mouth through which the tape is extracted and retracted. Furthermore, the rivets are prone to damage due to frequent hitting of the mouth of tape measure by the end hook. The speedy hitting of the case front or the mouth of tape measure by the end hook produces shear forces upon impact against the casing, leading to rivet fracture after repeated uses, and shortening the life of the tape measure accordingly. To remedy this problem, some tape measure has attachment of a soft metal piece to the tape below the end hook in attempt to increase the strength of the rivets to offset the aforesaid impact force resulting from rapid retraction of the tape. However, it remains failing to forfend fracture of the tape as described above because of lacking the additonal protection on the top side of the tape, and often loses its function totally when the tape is fractured and casuses the separation of the single metal piece attached at the bottom side.

SUMMARY OF THE INVENTION

In view of aforesaid disasdvantage, it is an object of this invention to provide an improvement for tape measure that can protect the tape, rivets and end hook more effectively.

The present invention is an improved structure for protecting an end hook, comprising the elements of a flexible elongated metal folder, with a slim parallel gap which is slightly greater than the thickness of the tape, and a metal end hook; at the outer edge of the tape, there is a rectangular notch, whose depth equals to or a little greater than the thickness of the folder, which has such a width that a closed end of the U-shaped flexible elongated metal folder can completely placed inside the rectangular notch when the outer end of tape is clampped with the flexible elongated metal folder axially along the length of the tape, thus forming a sandwich structure in which the flexible elongated metal folder lies closely on and beneath the tape. The end hook, which is made like a conventional tape measure end hook, is mounted on a top half of the metal folder, overlapping the tape and a bottom half of the metal folder. The metal folder is longer than the length of the end hook, so that an open end of the flexible elongated metal folder is stretched beyond the length of the end hook. A plurality of rivets are used to attach the end hook, the flexible elongated metal folder and the the tape, constituting a sandwich-like structure, which renders a reinforced strength to the combined structure of the conventional end hook and the tape, without affecting the function of the end hook in use.

For this improved end hook structure, there is at least one rivet which secures three elements together, the end hook, the flexible elongated metal folder and the tape, passing through a plurality of apertures on the four parts in the following order, the end hook, the top half of the flexible elongated metal folder, the tape and the bottom half of the flexible elongated metal folder.

At the extended portion of the flexible elongated metal folder without overlaping with the end hook has at least one rivet, which secures only two elements, the flexible elongated metal folder and the tape, passing through the apertures of the three parts in the following order, the top half of the flexible elongated metal folder, the tape and the bottom half of the flexible elongated metal folder. The end hook is riveted in such a manner that the end hook is float-movable along the longitudinal axis of the tape within the maximum amount of movement equal to the thickness of the end hook, so that both interior and exterior measurements are accurate, eliminating the mismeasurement that might occure due to the thickness of the end hook itself.

The conventional tape measureend hook is liable to give rise to rupture and fracture of the tape. Taking advantage of the three layer design inclusive of the top and bottom halves of the flexible elongated metal folder and the tape itself the present invention is an improvement to protect the tape, preventing it from rupture and fracture as stated above due to the stress of impact between the rivets and the tape. Furthermore, the folder is made of flexible metal, which is characterized by its flexibility, like a spring that is common in nature to the characteristic of the metallic tape itself. With the reinforcement of two layers of folder beyond the inner end of the end hook, the extended portion of the flexible elongated metal folder is capale of mitigating the occurence of abrupt fracture of the tape in the area below the inner end of the end hook, due to whipping up and down of the tape during its retraction. Additionally, the flexible elongated metal folder is able to protect the rivets by means of distributing the stress of impact among the following three layers of receptors, the top half of flexible elongated metal folder, the tape and the bottom half of the flexible elongated metal folder, alleviating the rivet failure thereby.

BRIEF DESCRIPTION OF THE DRAWINGS

The invention, as well as its many advantage, may be further understood by the following detailed description and drawings in which.

ILLUSTRATION FOR THE SYMBOLS

| | |
|---|---|
| 10 flexible elongated metal folder | 22 inner end |
| 11 top half | 23 aperture |
| 12 closed end | 30 metallic tape |
| 13 bottom half | 301 rectangular notch |
| 14 open end | 302 area of rupture |
| 15 aperture | 303 area of fracture |
| 16 aperture | 31 aperture |
| 20 end hook | 32 aperture |
| 21 outer end | 40 rivet |

DETAILED DESCRIPTION OF THE PREFERRED EMBODIMENT

Figure 1:
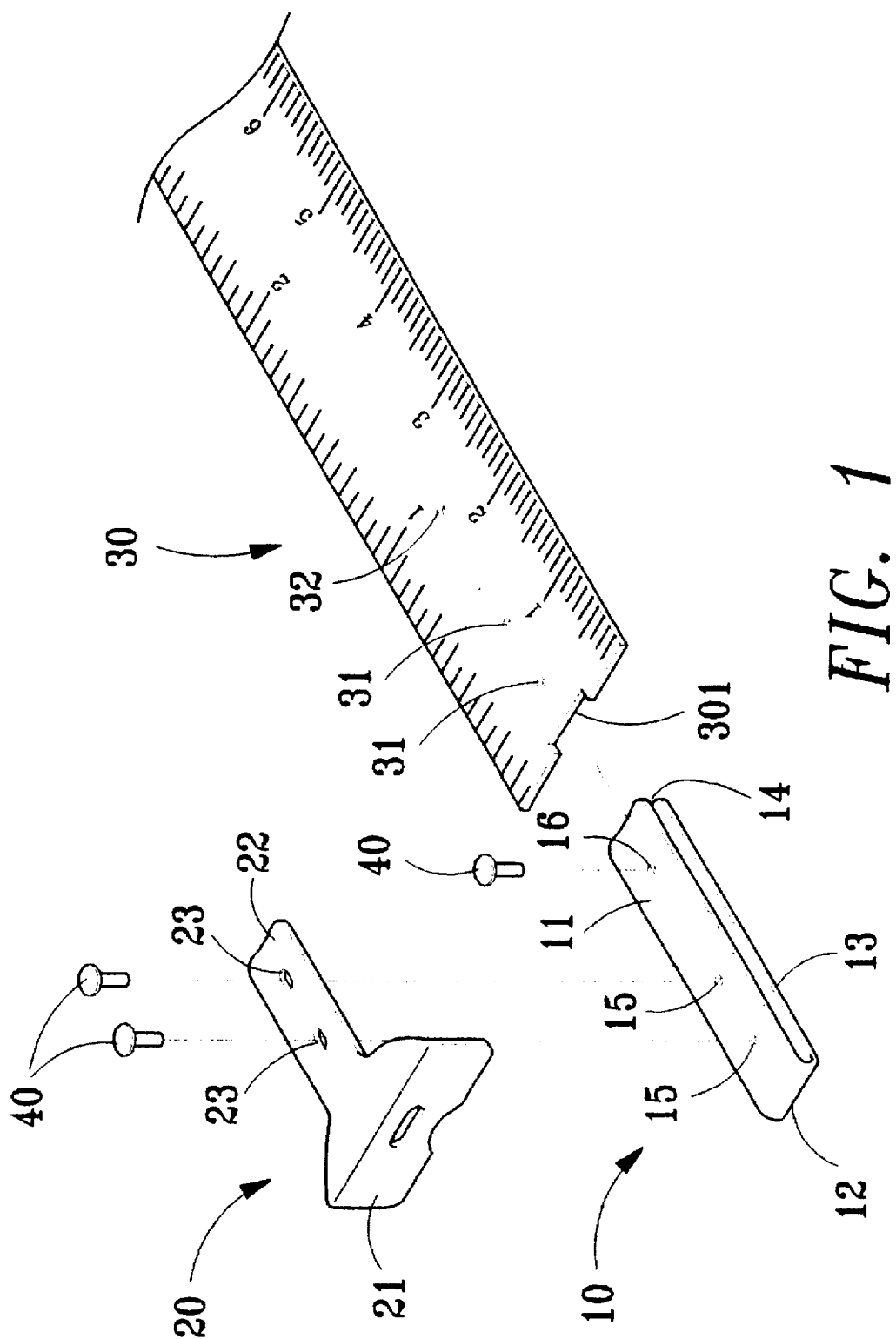
FIG. 1 is an exploded view of this invention.
Figure 2:
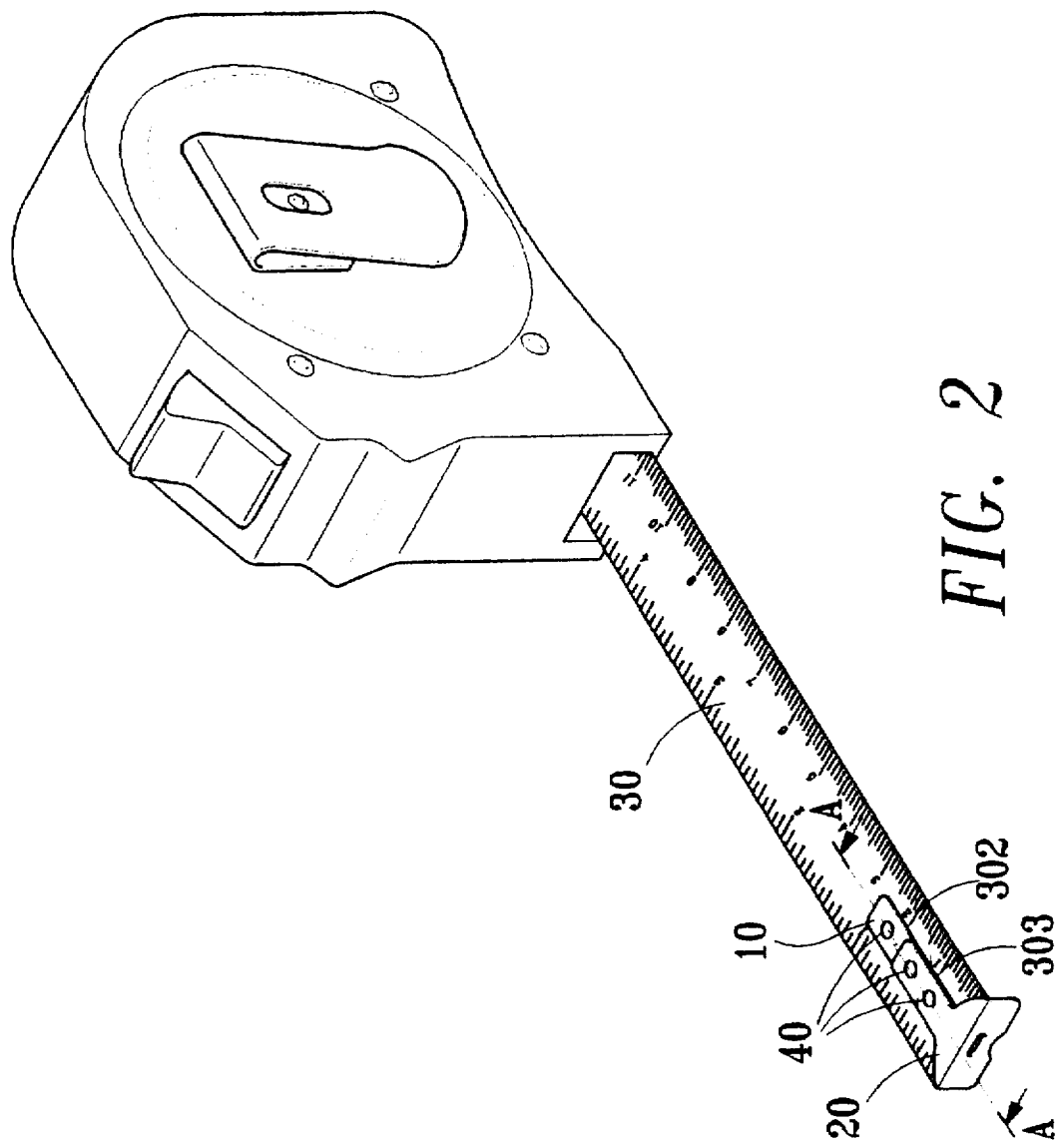
FIG. 2 is a perspective view of a tape measure including an embodiment of the end hook of the present invention.
Figure 3:
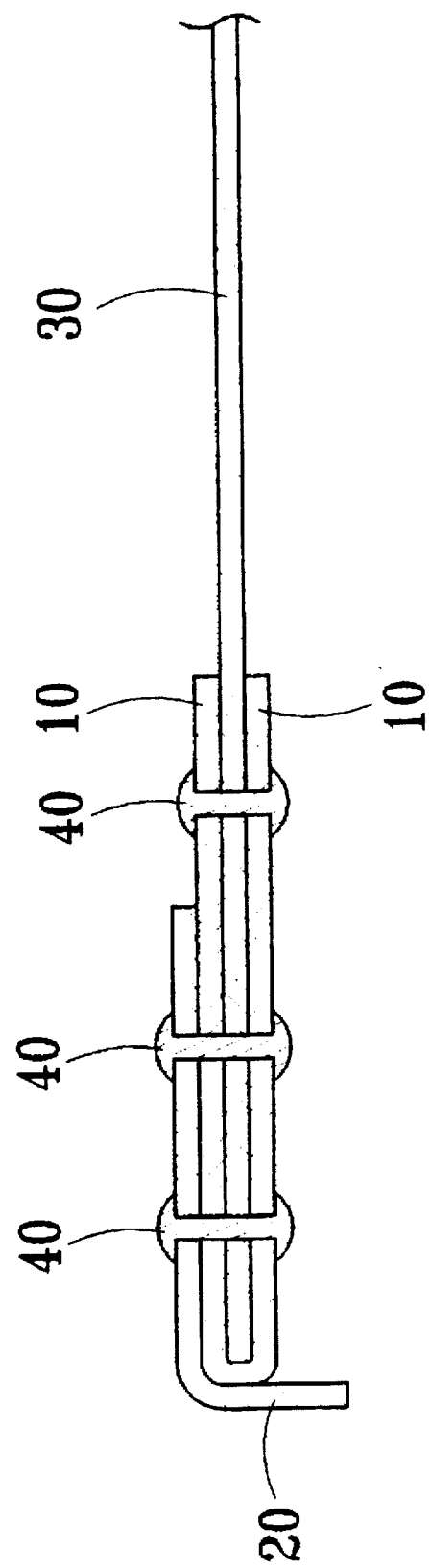
FIG. 3 is a sectional view taken on line A—A of FIG. 2.

Referring to FIGS. 1, 2 and 3, the present invention is an improved structure for protecting an end hook 20, comprising the elements of a flexible elongated metal folder 10, with a slim parallel gap which is slightly greater than the thickness of a tape 30, and a metal end hood 20; at the outer edge of the tape 30, there is a rectangular notch 301, whose depth equals to or a little greater than the thickness of the folder 10, which has such a width that a closed end 12 of the U-shaped flexible elongated metal folder 10 can completely placed inside the rectangular notch 301 when the outer end of tape 30 is clampped with the flexible elongated metal folder 10 axially along the length of the tape 30, thus forming a sandwich structure in which the flexible elongated metal folder 10 lies closely on and beneath the tape 30. The end hook 20, which is made like a conventional tape measure end hook, is mounted on a top half 11 of the metal folder 10, overlapping the tape 30 and a bottom half 13 of the metal folder 10. The metal folder 10 is longer than the length of the end hook 20, so that an open end 14 of the flexible elongated metal folder 10 is stretched beyond the length of the end hook 20. A plurality of rivets 40 are used to attach the end hook 20, the flexible elongated metal folder 10 and the the tape 30, constituting a sandwich-like structure, which renders a reinforced strength to the combined structure of the conventional end hook 20 and the tape 30, without affecting the function of the end hook 20 in use.

For this improved end hook structure, there is at least one rivet 40 which secures three elements together, the end hook 20, the flexible elongated metal folder 10 and the tape 30, passing through a plurality of apertures (23,15,31) on the four parts in the following order, the end hook 20, the top half 11 of the flexible elongated metal folder 10, the tape 30 and the bottom half 13 of the flexible elongated metal folder 10.

At the extended portion of the flexible elongated metal folder 10 without overlapping with the end hook 20 has at least one rivet 40, which secures only two elements, the flexible elongated metal folder 10 and the tape 30, passing through the apertures (16,32) of the three parts in the following order, the top half 11 of the flexible elongated metal folder 10, the tape 30 and the bottom half 13 of the flexible elongated metal folder 10. The end hook 20 is riveted in such a manner that the end hook 20 is float-movable along the longitudinal axis of the tape 30 within the maximum amount of movement equal to the thickness of the end hook 20, so that both interior and exterior measurements are accurate, eliminating the mismeasurement that might occure due to the thickness of the end hook 20 itself.

The conventional tape measure end hook is liable to give rise to rupture of the tape in the area 302 and fracture of the tape in the area 303. The present invention is an improvement to protect the tape 30, preventing it from rupture and fracture as stated above due to the stress of impact between the rivet 40 and the tape 30. Furthermore, the folder 10 is made of flexible metal, which is characterized by its flexibility, like a spring that is common in nature to the characteristic of the metallic tape 30 itself. With the reinforcement of two layers of folder beyond an inner end 22 of the end hook 20, the extended portion of the flexible elongated metal folder 10 is capale of mitigating the occurence of abrupt fracture of the tape in the area below the inner end 22 of the end hook 20. Additionally, the flexible elongated metal folder 10 is able to protect the rivets 40 by means of distributing the stress of impact among the following three layers of receptors, the top half 11 of flexible elongated metal folder 10, the tape 30 and the bottom half 13 of the flexible elongated metal folder 10, alleviating the rivet failure.

Of course, it should be understood that various changes and modifications to the preferred embodiment herein will be apparent to those skilled in the art. For example, the ranges disclosed herein, such as the number of rivets and the shape of the metal folder, etc, are exemplary and should not be construced as limiting. Such changes and modifications can be made without departing from the scope of the present invention and without diminishing its attendant advantages. It is, therefore, intended that such changes and modifications be covered by the following claims.

What is claimed is:

1. An improvement for tape measure comprising:

a metallic tape having a rectangular notch formed at the outer edge;

a U-shaped flexible elongated metal folder for sandwiching the outer end of the metallic tape therebetween with the closed end thereof engaging with the notch and the open end stretching along the longitudinal axis of the tape; and an end hook disposed above the flexible elongated metal folder with an overlapping portion; wherein the metallic tape, the flexible elongated metal folder and the end hook are riveted together; the flexible elongated metal folder is longer than the end hook, with its extended portion without overlapping with the end hook, wherein the flexible elongated metal folder and the tape are riveted together.

2. An improvement for tape measure of claim 1, wherein the overlapping portion of the end hook, the flexible elongated metal folder and the tape is riveted together by at least one rivet.

3. An improvement for tape measure of claim 1, wherein the flexible elongated metal folder and the metallic tape without the end hook overlapping thereof is riveted together by at least one rivet.

4. An improvement for tape measure of claim 1, wherein the end hook is float-movable along the longitudinal axis of the tape within the maximum amount of movement equal to the thickness of the end hook, so that both interior and exterior measurements are acurate.

5. An improvement for tape measure of claim 2, wherein the end hook is float-movable along the longitudinal axis of the tape within the maximum amount of movement equal to the thickness of the end hook, so that both interior and exterior measurements are acurate.

* * * * *